Patented May 6, 1930

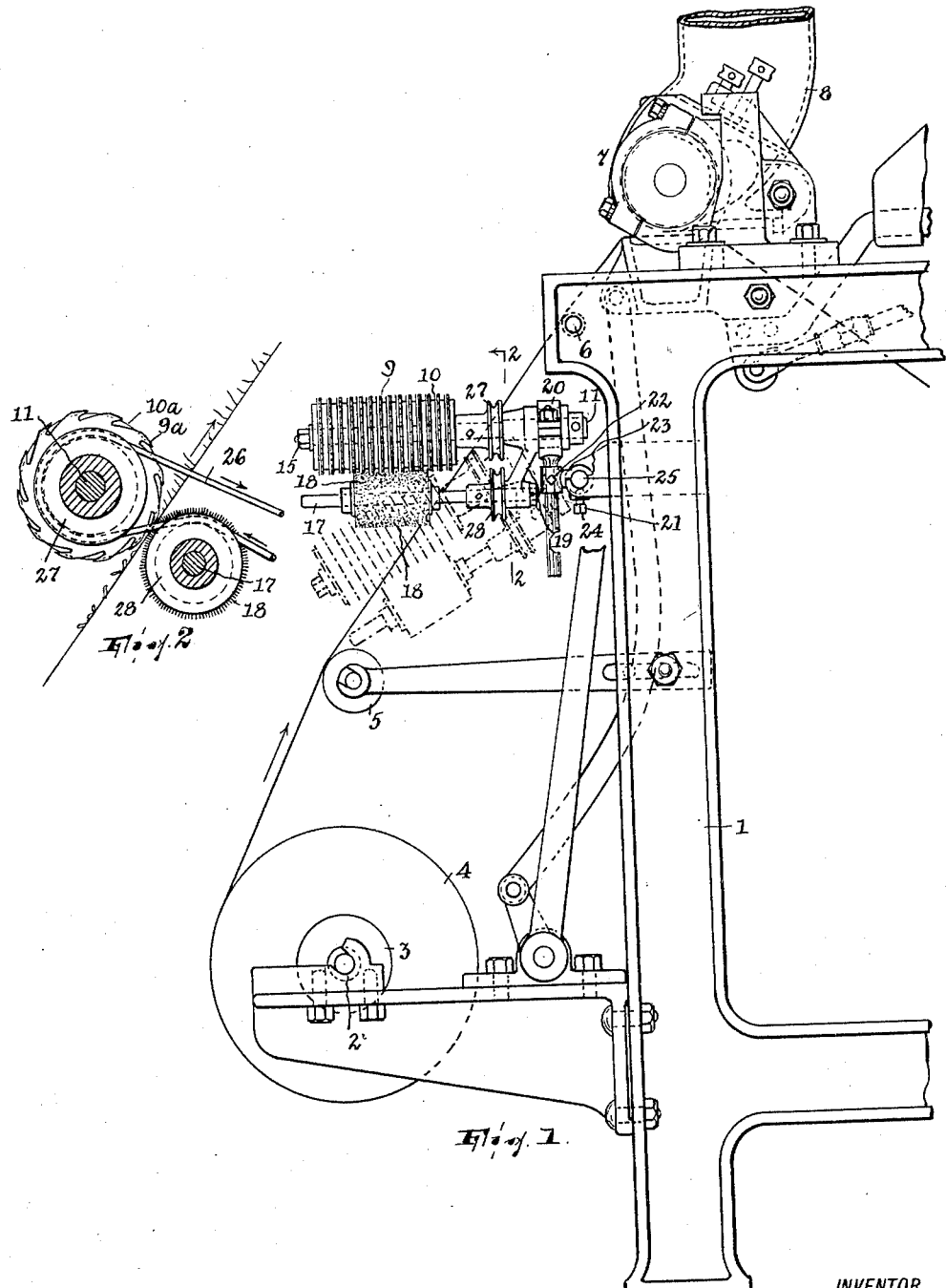

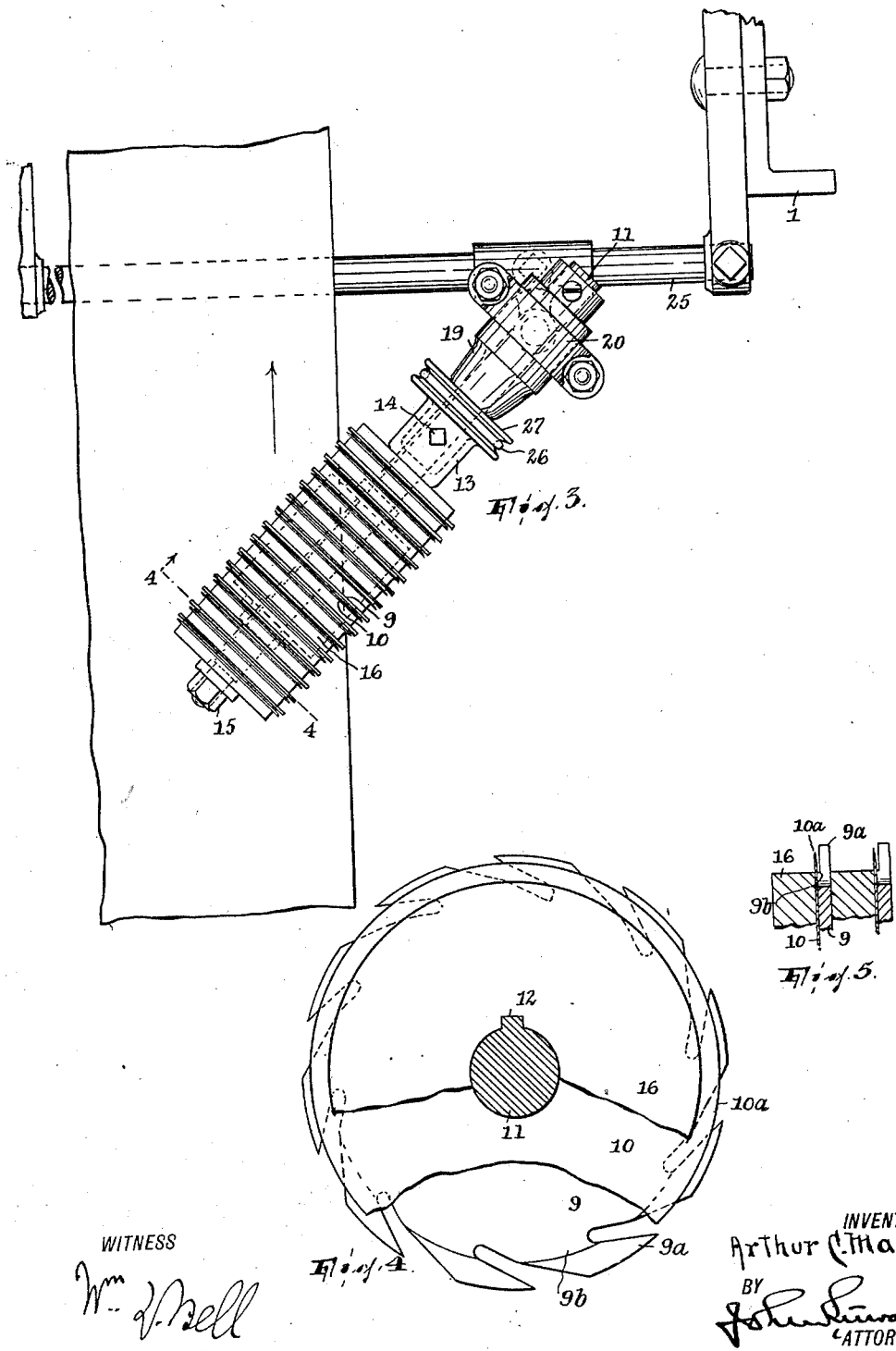

1,757,536

UNITED STATES PATENT OFFICE

ARTHUR C. MASON, OF HAWTHORNE, NEW JERSEY

FABRIC-TREATING MACHINE

Application filed January 17, 1928. Serial No. 247,311.

This invention relates to apparatus for treating fabrics in the removal therefrom of floats left in the weaving. The object of the invention is to provide means whereby, with expedition and without the application of any particular skill on the part of the attendant, a fabric may be operated upon so as to part floats existing therein, preferably in such manner, as by severing, that such parting will take place in the float itself and without drawing on the thread involved in a way to produce a blemish in the fabric.

In the drawings,

Fig. 1 is a side elevation of the invention shown associated with a fabric shearing means;

Fig. 2 is a section on line 2—2, Fig. 1 with the working parts illustrated arranged in that position where they receive the fabric between them;

Fig. 3 is an elevation of the part of the fabric being treated and of my apparatus in operative relation thereto;

Fig. 4 is an enlarged transverse section of the rotary float-parting element of my apparatus, with parts thereof fragmentarily shown; and Fig. 5 is a radial fragmentary sectional view of said element.

Usually, after the floats are parted the thread stubs or projections remaining are removed in some way, as by the fabric shearing means set forth in Patent No. 1,548,369. Hence I illustrate the invention herein in connection with a machine embodying such a means, 1 being a suitable frame affording support at 2 for the beam 3 on which the roll of fabric 4 to be treated is wound, 5 a roll journaled in a part of the frame parallel with said beam and affording a guide for the fabric and 6 another guide spaced therefrom, and 7 generally denoting said means and having at 8 a suction nozzle through which the cut-off projections are drawn away from the cutting mechanism of this means. The guides 5 and 6, as Fig. 1 shows, maintain the fabric stretched between them.

The aforesaid rotary element is preferably of generally cylindrical form, with series of catching portions or hooks and cooperating cutting edges, arranged around its axis and forming its periphery, alternating with each other. Each series of hooks is here formed, as at $9^a$, at the periphery of a disk 9, each hook projecting in one circular direction of such periphery. Each cutting edge is here formed, as at $10^a$, by beveling and sharpening the periphery of a disk 10. In the example, one such disk 9 coacts in the parting of the floats with one such disk 10, as will be explained, and for this purpose the cutting edge $10^a$ has a diameter less than that represented by the points or free ends but greater than that represented by the bases of the series of hooks $9^a$ and, while it lies operatively close to the series of hooks, is spaced therefrom by a slight thickening-up of the disk 9 to form in effect a hub $9^b$ thereon (Figs. 4 and 5). A number of pairs of the disks (9 and 10) are arranged on a common shaft 11, to which they are preferably splined, as at 12, and between a collar 13, secured on this shaft by a set screw 14, and a nut 15, screwed on the shaft, they are clamped with spacing disks 16 (Figs. 3 and 5) alternating with said pairs. When this rotary element rotates in the direction in which the hooks project and with its periphery in operative proximity to a fabric having floats thereon so that the hooks will enter and thereby catch the floats, those so caught by the hooks of any disk 9 will slip inward on the hooks and so against the cutting edge of the companion disk 10 and be severed.

To insure all floats being caught it is desirable that the fabric be supported so as to yield to said rotary element when, as will usually be the case, it rotates in actual contact with the fabric, and for this purpose the fabric may be backed or supported opposite said element by a device which is in effect a rotary brush, here shown as comprising an axial portion or spindle 17 and stiff radial bristles 18 projecting therefrom; in the present example the said rotary element and this device, or brush, are journaled on parallel axes in a bracket 19. Further, said element, while it should of course be arranged so that for its full length its periphery is in contact with or uniformly close to the fabric, should be capable of movement so as to act on either warp floats or weft floats or selvage floats,—usually more or less oblique to the path of travel of the fabric when warp or weft floats are treated and parallel with said path when edge floats are treated. In view of these and other considerations it is best in a practical application of the invention for bracket 19 to be adjustably supported, wherefore I provide for its support as follows: A clamp 20 embraces the bracket 19 and has a radial stud 21 projecting therefrom. This stud is longitudinally and rotatively adjustably held (by a set screw 22) in one sleeve portion of a gimbal 23 whose other sleeve portion is longitudinally and rotatively held (by a set screw 24) on the horizontal supporting shaft 25. Thus the bracket, with said rotary element and brush, may not only be adjusted along the shaft 25 to any position transversely of the path of travel of the fabric, but the universality of movement afforded by the gimbal permits said element and brush to be set at any inclination or at any degree of obliqueness or at right angles or parallel to the path of travel of the fabric, as the circumstances may require.

Of course the said rotary float-parting element is rotated by some means in the proper direction hereinbefore indicated, such means being shown in Fig. 2 as a belt 26, assumed to be suitably driven, engaging a pulley 27 on the collar 13; this belt may also, through a pulley 28, drive a brush.

Where fabrics are woven in looms having automatic means to replenish the filling the floats usually occur in each selvage region, in which cases it is unnecessary for the float-parting element and brush to have greater longitudinal extent than as shown by Fig. 3.

The catching portions 9ª are in the present case hooks of the kind that project in one circular direction of the periphery of the float-parting element and are undercut.

Sometimes an edge-float will stand underlapped, i. e., folded or bent back upon that face of the fabric which is in the illustration next to the brush, so that with the parting element alone present such a float would escape unparted. Hence the brush constitutes means for sweeping or displacing such floats into a position in which they are not screened by the fabric but project laterally outward from its edges within the reach of the parting element.

Having thus fully described my invention, what I claim is:

1. Supporting means in which the fabric to be treated is stretched, in combination with a rotary element journaled in said means with its periphery close to the fabric and having at its said periphery a series of float-catching portions extending around its periphery and means, coactive with each such portion, to sever a float when caught thereby.

2. Supporting means in which the fabric to be treated is stretched, in combination with a rotary element journaled in said means with its periphery close to the fabric and having at its said periphery a series of undercut float-catching hooks extending around its periphery and projecting in one circular direction of such periphery, and means, beside each hook, to sever a float when caught thereby.

3. Supporting means in which the fabric to be treated is stretched, in combination with a rotary element journaled in said means with its periphery close to the fabric and comprising a series of coaxial disks, alternate disks having peripheral float-catching portions and the remainder float-severing edges coactive with said portions to sever the floats caught thereby.

4. Supporting means in which the fabric to be treated is stretched, in combination with a rotary element having its periphery close to one face of the fabric and having peripheral means to disrupt threads of the fabric upon said face, said element being pivotally adjustable in substantial parallelism with said face of the fabric.

5. Supporting means in which the fabric to be treated is stretched, in combination with a rotary element having its periphery close to one face of the fabric and having peripheral means to engage portions of the fabric upon said face, and a gimbal support for said element.

6. In combination with supporting means, coacting means between which the fabric to be treated is adapted to be stretched, one of said means including a rotary substantially cylindrical element having a series of spaced rigid peripheral catching portions to engage projections on the fabric and the other comprising a rotary core opposed to said element and yielding bristles arrranged around and projecting therefrom and formed as a substantially cylindrical support for the fabric.

7. Supporting means in which the fabric to be treated is stretched, in combination with means, arranged opposite one face of the fabric and projecting beyond the selvage edge thereof, to part floats existing on such face and at said edge, and means to displace edge floats folded upon the opposite face of the fabric into laterally outwardly projecting relation to such edge and hence into the reach of the second-named means.

8. In combination, with supporting means, coacting means between which the fabric to be treated is adapted to be stretched, one of said means including rigid portions to engage projections on the fabric and the other comprising a rotary core opposed to said one of said coacting means and yielding bristles arranged around and projecting from the core and formed as a substantially cylindrical support for the fabric.

9. Supporting means in which the fabric to be treated is stretched, in combination with a rotary element having its periphery close to one face of the fabric and having peripheral means to disrupt threads of the fabric upon said face, said element being adjustable in substantial parallelism with said face of the fabric.

In testimony whereof I affix my signature.

ARTHUR C. MASON.